United States Patent
Lim et al.

(10) Patent No.: US 8,712,959 B1
(45) Date of Patent: Apr. 29, 2014

(54) COLLABORATIVE DATA REDUNDANCY FOR CONFIGURATION TRACKING SYSTEMS

(75) Inventors: Swee B. Lim, Cupertino, CA (US); Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1354 days.

(21) Appl. No.: 11/238,492

(22) Filed: Sep. 28, 2005

(51) Int. Cl.
*G06F 17/30* (2006.01)

(52) U.S. Cl.
USPC .......................................................... 707/633

(58) Field of Classification Search
None
See application file for complete search history.

(56) References Cited

U.S. PATENT DOCUMENTS

| | | | | |
|---|---|---|---|---|
| 5,608,865 | A * | 3/1997 | Midgely et al. ................... | 714/1 |
| 5,748,956 | A | 5/1998 | Lafer et al. | |
| 5,778,395 | A * | 7/1998 | Whiting et al. ............... | 707/204 |
| 6,405,364 | B1 | 6/2002 | Bowman-Amuah | |
| 6,629,110 | B2 * | 9/2003 | Cane et al. ..................... | 707/204 |
| 6,847,984 | B1 * | 1/2005 | Midgley et al. ............... | 707/204 |
| 6,957,186 | B1 | 10/2005 | Guheen et al. | |
| 7,043,486 | B2 * | 5/2006 | Cope ............................. | 707/100 |
| 7,062,455 | B1 * | 6/2006 | Tobey ............................ | 705/28 |
| 7,062,718 | B2 | 6/2006 | Kodosky et al. | |
| 7,181,454 | B1 | 2/2007 | McClamroch et al. | |
| 7,210,060 | B2 * | 4/2007 | Chai et al. ........................ | 714/6 |
| 2003/0101022 | A1 | 5/2003 | Shah et al. | |
| 2003/0233438 | A1 * | 12/2003 | Hutchinson et al. .......... | 709/223 |
| 2004/0093361 | A1 * | 5/2004 | Therrien et al. ............... | 707/204 |
| 2004/0107125 | A1 * | 6/2004 | Guheen et al. ..................... | 705/7 |
| 2005/0027757 | A1 * | 2/2005 | Kiessig et al. ................ | 707/204 |
| 2005/0097149 | A1 * | 5/2005 | Vaitzblit et al. ............... | 707/202 |
| 2005/0216757 | A1 | 9/2005 | Gardner | |
| 2005/0216788 | A1 * | 9/2005 | Mani-Meitav et al. ........... | 714/6 |
| 2006/0026220 | A1 * | 2/2006 | Margolus ...................... | 707/204 |
| 2006/0200477 | A1 | 9/2006 | Barrenechea | |
| 2007/0143373 | A1 * | 6/2007 | D'Souza et al. .............. | 707/204 |

\* cited by examiner

*Primary Examiner* — Bai D. Vu
(74) *Attorney, Agent, or Firm* — Robert C. Kowert; Meyertons, Hood, Kivlin, Kowert & Goetzel, P.C.

(57) ABSTRACT

In one embodiment, a method and apparatus for collaborative data redundancy for configuration management database is disclosed. The method includes requesting, by a server of a configuration tracking system, an agent of the configuration tracking system to retrieve asset data when a copy of the asset data located in the server becomes corrupted, retrieving by the agent the requested asset data from one or more assets, and transferring by the agent the asset data to the server without utilizing data redundancy services performed outside of the configuration tracking system. Other embodiments are also disclosed.

20 Claims, 6 Drawing Sheets

COLLABORATIVE DATA REDUNDANCY FOR CONFIGURATION TRACKING SYSTEMS

FIELD OF INVENTION

An embodiment of the invention relates to configuration tracking systems, and more specifically, to collaborative data redundancy for configuration tracking systems.

BACKGROUND OF INVENTION

A configuration tracking system keeps track of changes to the configuration of assets such as computers, storage devices, network devices, and software packages. A configuration tracking system implements a service that allows clients of the service (users or other systems) to interact with the configuration system. The interactions may be to obtain the most recent configuration for an asset or a history of changes to the configuration of an asset.

In a traditional configuration tracking system implementation, there are usually at least two components. The first component is the agent that interacts with one or more assets to obtain asset data, such as asset component inventory and configuration information. The second component is the server that receives the asset data from the agent(s) and stores the asset data in one or more databases. The server also implements a service that is used by clients to access the asset information maintained by the configuration tracking system. Typically, the server stores asset information in a database. The database may be stored in a file system or directly on disk volumes.

The availability of a service, such as the configuration tracking service, is related to cost, complexity, and overhead of the service. The availability of the configuration tracking service is a key concern because IT organizations and organizations that provide IT services depend on this vital infrastructure. One mechanism to increase availability of a configuration tracking system is to implement data redundancy. Data redundancy refers to the process of maintaining more than one copy of data to increase availability by eliminating or reducing effects of data storage device failures.

The traditional approach to increasing availability of a configuration tracking system is through applying conventional clustering techniques to the server component for local failover, and applying remote database or storage replication techniques to the server database for disaster recovery (i.e., wide area failover). In both cases, the configuration tracking system relies on the underlying infrastructure, such as clustering software or underlying wide area replication technologies, to provide for data redundancy. This is known as "implicit data redundancy" because the configuration tracking system is not an active participant in maintaining data redundancy; instead, the data redundancy is a feature of the technology infrastructure and platform on which the configuration tracking system is deployed.

Implicit data redundancy is convenient because configuration tracking service implementations do not have to be directly concerned with data redundancy. They assume that data redundancy will be provided by lower level platform or technology components, and it is these lower level components that will determine data redundancy policies and operations. However, implicit data redundancy many times results in services being built around a notion of a single data instance. A single data instances means that a service operates with and understands only a single instance of data.

A key problem with this approach is the corruption of the single instance leading to inconsistencies and possible complete loss of data. Another problem with the notion of a single data instance is that either a service is available if its data is accessible (normal operation) or not available if its data is not accessible (no operation). There is no option for providing a degraded, yet available, service. This is known as the binary notion of availability.

Implicit data redundancy pushes the responsibility for data availability to the lower level infrastructure, deployment design, and operations. However, single data instance consistency can be very costly and difficult to implement, especially for disaster recovery purposes. In practice, there will be multiple instances of the data, but the service will only interact with a single instance at a time. Hence, implicit data redundancy does not eliminate the need to think about and address inconsistencies among multiple instances of data.

SUMMARY OF INVENTION

The present invention includes novel methods and apparatus for collaborative data redundancy for configuration tracking systems.

According to one embodiment of the invention, a method is disclosed. The method includes requesting, by a server of a configuration tracking system, an agent of the configuration tracking system to retrieve asset data when a copy of the asset data located in the server becomes corrupted, retrieving by the agent the requested asset data from one or more assets, and transferring by the agent the asset data to the server without utilizing data redundancy services performed outside of the configuration tracking system.

According to another embodiment of the invention, an apparatus is disclosed. The apparatus includes an agent of a configuration tracking system application, and a server of the configuration tracking system application communicatively coupled to the agent, operating to request the agent to retrieve asset data when a copy of the asset data located in the server becomes corrupted, receive the asset data from the agent without utilizing data redundancy services performed outside of the configuration tracking system application, wherein the agent retrieves the requested asset data from one or more assets.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
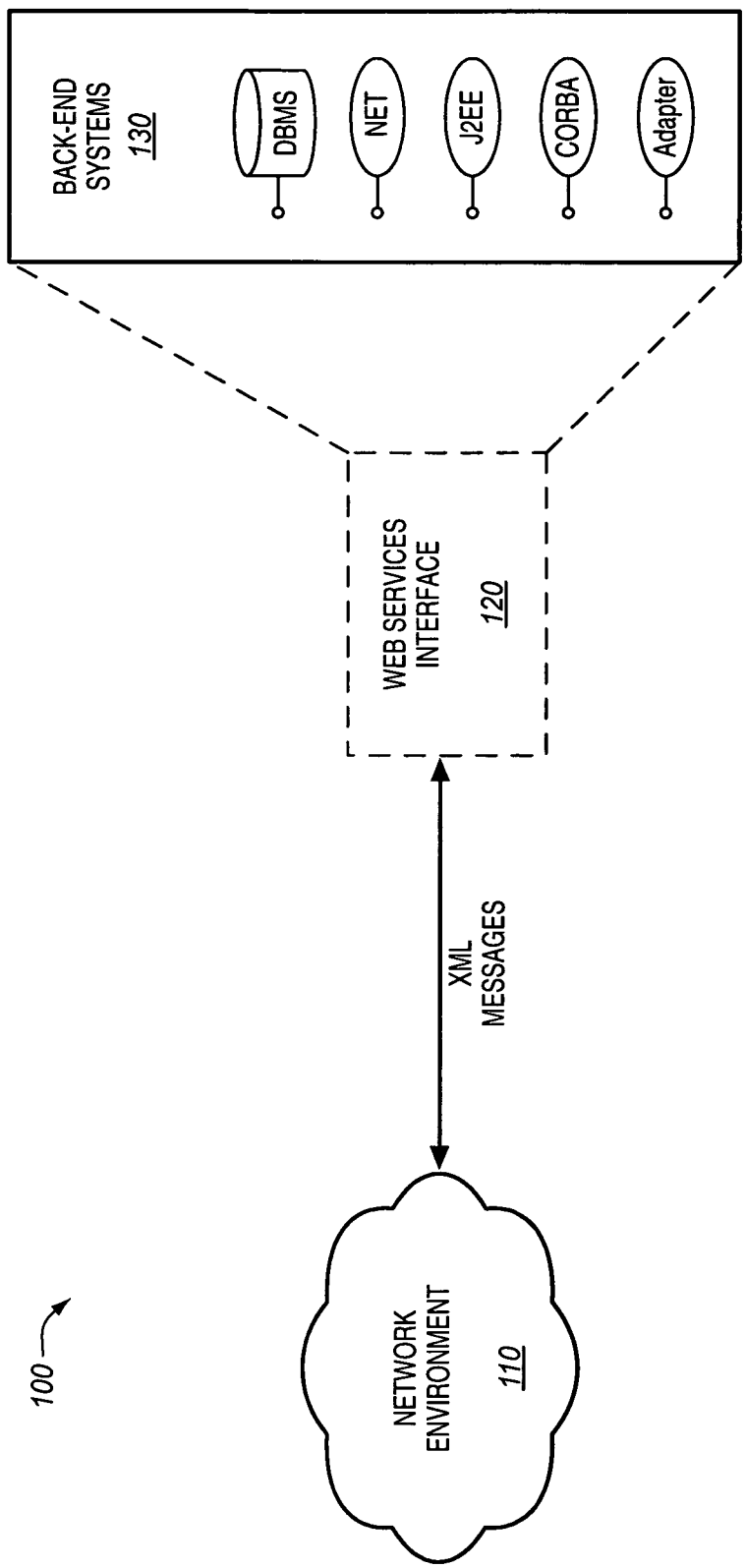
FIG. 1 is a block diagram of one embodiment of a network system.

A method and apparatus are described for collaborative data redundancy for configuration tracking systems. According to one embodiment, the method includes requesting, by a server of a configuration tracking system, an agent of the configuration tracking system to retrieve asset data when a copy of the asset data located in the server becomes corrupted, retrieving by the agent the requested asset data from one or more assets, and transferring by the agent the asset data to the server without utilizing data redundancy services performed outside of the configuration tracking system.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

FIG. 1 illustrates a block diagram of one embodiment of a network system 100 capable of supporting collaborative data redundancy for a configuration tracking system of embodiments of the present invention. Network system 100 includes a network environment 110, a web services interface 120, and a back-end system 130. The web services interface 120 allows for a standard approach for the network environment 110 to interface with back-end software systems 130. Such back-end systems 130 may include database management systems (DBMS), .NET, J2EE (Java2 Platform, Enterprise Edition), CORBA (common object request broker architecture), objects, adapters to enterprise resource planning (ERP) packages, integration brokers, and others.

The web services interface 120 may receive a standard Extensible Markup Language (XML) message from the networking environment 110, transform the XML data into a format understood by a particular back-end software system 130, and, optionally, return a reply message.

Figure 2:
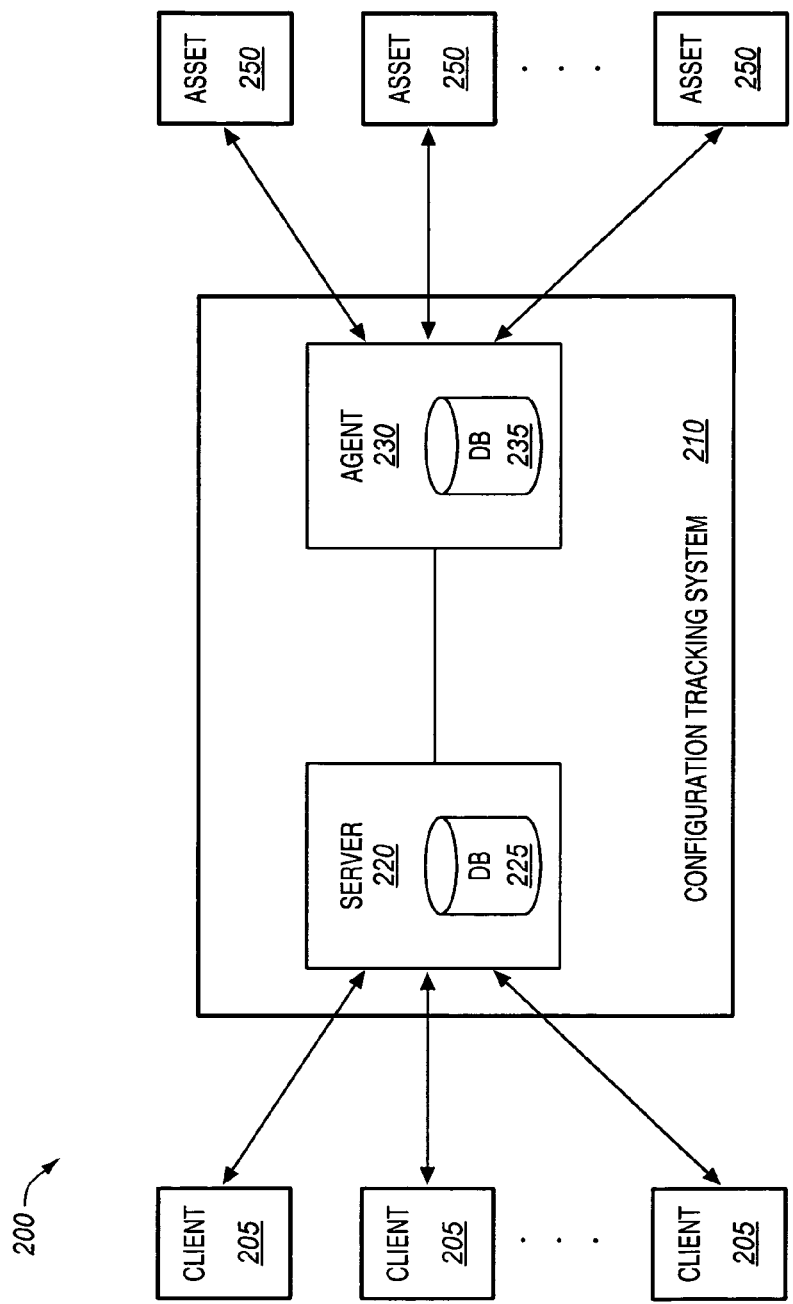
FIG. 2 is a block diagram illustrating one embodiment of a configuration tracking system.

Referring to FIG. 2, a block diagram illustrating one embodiment of a system 200 for collaborative data redundancy in a configuration tracking system is presented. System 200 includes multiple clients 205, a configuration tracking system 210, and a plurality of assets 250. The configuration tracking system 210 may be representative of any application used to integrate and store configuration information related to a plurality of assets, such as assets 250. Clients 205 may invoke the service of the configuration tracking system 210. Configuration tracking system 210 gathers and maintains data related to assets 250 for further use by clients 205.

The configuration tracking system 210 may further include a server 220 and an agent 230. In one embodiment, the server 220 and the agent 230 may be implemented as back-end systems 130 described with respect to FIG. 1. Server 220 includes a database 225 to store the asset data. Agent 230 operates to obtain asset data from the plurality of assets 250, and transfer the asset data to the server 220 for storage. Agent 230 may also include a database or other storage 235 for caching current and historical asset data of the assets 250. In some embodiments, the components of the configuration tracking system 210 may be geographically distributed in different data center.

In some embodiments, the server 220 may contain asset information relating to the asset, instead of the actual asset data. The asset information may not be an exact copy, but rather a processed version of the asset data that provides more informational value. For example, this information value-add may be that the asset data is checked for consistency, reformatted for storage, or linked with other information to track relationships among assets.

In some embodiments there may be a plurality of servers 220 and agents 230 operating in the configuration tracking system 210. In one embodiment, there may be more agents 230 than servers 220. If there are multiple servers 220, then asset 250 information may be replicated among the multiple server instances. In other embodiments, the agent 230 may be co-resident with the asset 250 (i.e., agent 230 may run within the asset 250 or may run external to the asset). Furthermore, the relationship of agents 230 to assets 250 may be 1-1, N-1, 1-N, or M-N relationship.

Embodiments of the invention are based on the following realities: (1) the configuration tracking server 220 is not the authoritative data source—rather, it is the plurality of assets 250 that are the authoritative data source; and (2) the asset data maintained by the configuration tracking server 220 may be stale once the data is collected from the source asset 250.

Embodiments of the invention propose an alternate way of maintaining asset data redundancy based on the concept of explicit data redundancy. Explicit data redundancy is the alternative to implicit data redundancy. With explicit data redundancy, an application may take an active role in maintaining data redundancy. For example, in some embodiments, the configuration tracking system 210, including both the agent 230 and server 220 components, actively participates in maintaining asset data redundancy. This is achieved by the configuration tracking system 210 actively distributing multiple instances and versions of the asset data through the different components of the system 210 that may be deployed in different parts of the network. Such an implementation allows parts of the system to fail while leveraging other sources of the system with the same information to recover from these failures.

The asset data collected by the agent 230 represents a snapshot in time of the asset's 250 state. The configuration tracking server data may be stale because the agent 230 may only execute periodically or on-demand (e.g., when requested by an administrator or by the server). Even if the agent 230 can instantly discover changes, there is may still be a delay to transport the new data to the configuration tracking server 220, and for the configuration tracking server 220 to consume the asset data and update its database 225. Furthermore, transmitting asset data over unreliable wide-area networks (such as the Internet) may introduce additional delays due to congestion or network connectivity failures.

As the configuration tracking system 210 is loosely consistent with the actual asset state, and as the authoritative source of asset data is the asset 250, it is possible to reconstruct the most recently known asset information into the configuration tracking database 250 by obtaining asset data from the plurality of assets 250, or from their proxies (such as the agent 230) if the configuration tracking server database 225 is corrupted or lost. Embodiments of the invention take advantage of a pro-active collaboration between the agent 230 and the configuration tracking server 220 to maintain asset data redundancy.

Figure 3:
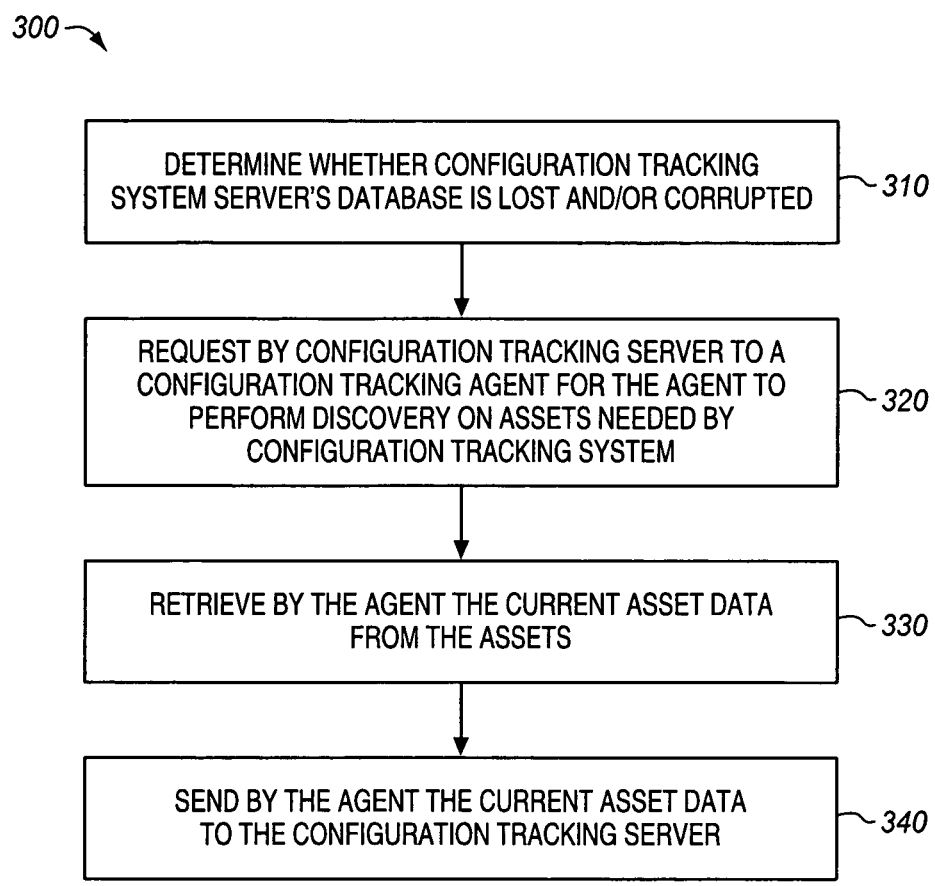
FIG. 3 is a flow diagram depicting a method of one embodiment of the invention.

FIG. 3 is a flow diagram illustrating a method 300 of one embodiment of the present invention. Method 300 illustrates one embodiment of pro-active collaboration between a configuration tracking server and a configuration tracking agent to maintain asset data redundancy via an explicit data redundancy technique. In some embodiments, method 300 is performed by the components illustrated with respect to FIG. 2.

In some embodiments, the same data may be available in multiple places naturally. For example, a configuration tracking system may store asset data acquired from an asset in a configuration tracking database located in the server. When the configuration tracking database is not available or corrupted, the same information is naturally available from the asset. This information can be acquired from the asset if the agent is always connected to the asset and the server, or when the agent connects again to the server if the agent and server are not always connected, or when the agent connects again to the asset if the agent and asset are not always connected. In one embodiment, method 300 utilizes this natural redundancy to provide explicit data redundancy in a configuration tracking application.

Method 300 begins with processing block 310, where it is determined whether the configuration tracking server database is lost or corrupted. In some embodiments, the configuration tracking server performing the following process may be a different server than the corrupted configuration tracking server if the original configuration tracking server is also lost (i.e., not just the database is lost, but the server is lost as well). In some embodiments, this server may be in a disaster recovery site. If the configuration tracking server database is lost or partially corrupted, then, at processing block 320, the configuration tracking server requests the configuration tracking agent to perform discovery on the assets. This discovery is performed on the assets having the asset data that was lost and/or corrupted in the original configuration tracking server database. The discovery determines the particular assets and corresponding asset data needed by the configuration tracking system. At processing block 330, the configuration tracking agent retrieves the current asset data from the assets. Finally, at processing block 340, the configuration tracking agent sends the current asset data to the configuration tracking server.

In some embodiments, the configuration tracking server may contain asset information relating to the asset, instead of the actual asset data. The asset information may not be an exact copy, but rather a processed version of the asset data that provides more informational value. For example, this information value-add may be that the data is checked for consistency, reformatted for storage, or linked with other information to track relationships among assets.

In one embodiment, if the configuration tracking agent is always reachable or connected to the configuration tracking server, then the server may ask the agent to perform discovery and send the current asset data back to the server. However, in some embodiments, if agent is not always connected, the server may ask the agent to perform discovery whenever the agent reconnects. In other embodiments, if the agent is not always connected to the asset, the agent may delay discovery until the agent is reconnected to the asset. During the time window that no asset data is available, the server may indicate to any asset data consumers, such as clients of the configuration tracking service, that the data is temporarily unavailable.

As a result, a form of degraded service may be provided in the sense that the configuration tracking system has information on some subset of assets, but not all of the assets. This is an improvement over providing no service at all. In other embodiments, the client of the configuration tracking service may also request a callback from the service when data about the selected assets is available.

Figure 4:
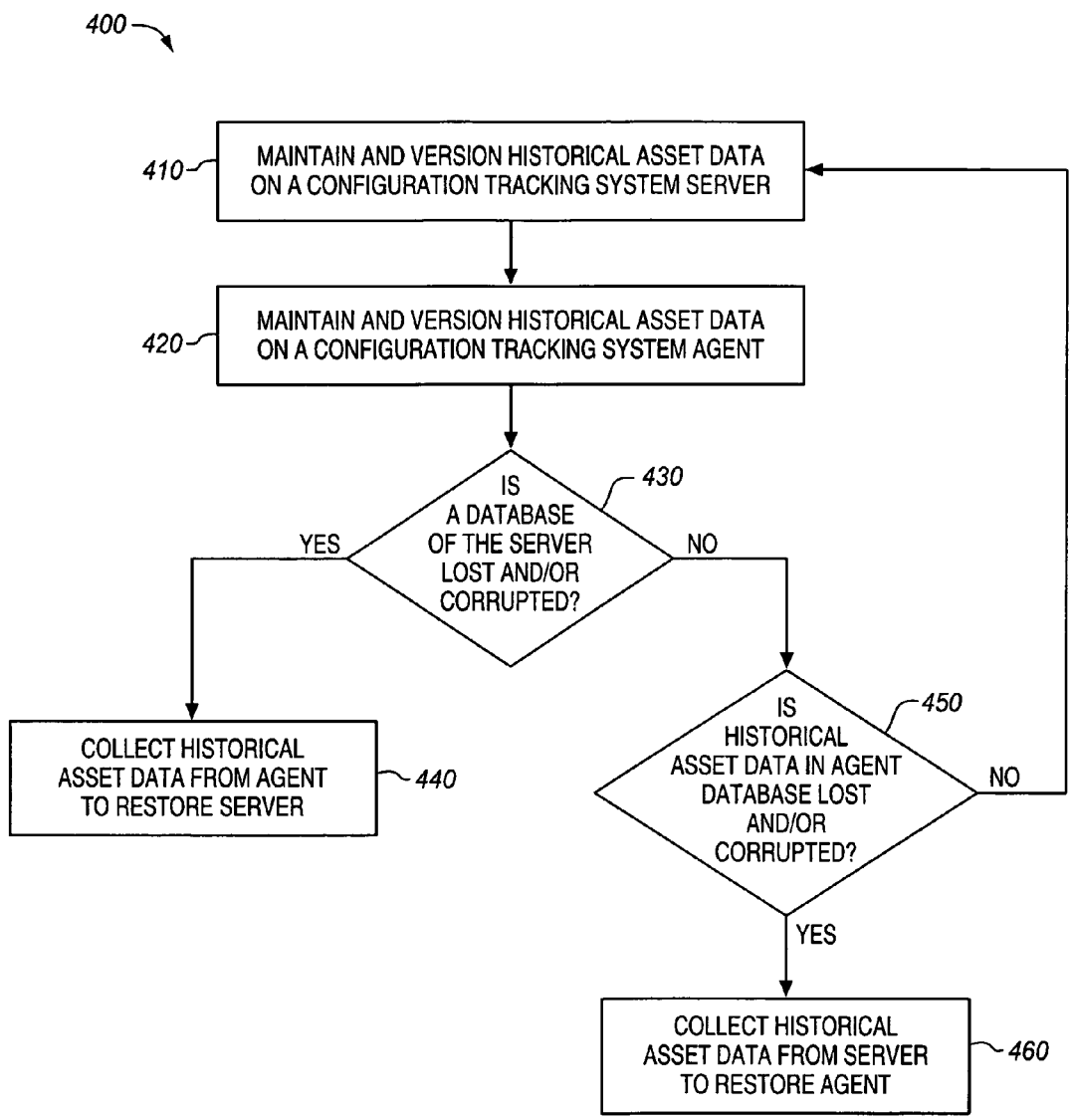
FIG. 4 is a flow diagram depicting a method of another embodiment of the invention.

FIG. 4 is a flow diagram illustrating a method 400 of another embodiment of the invention. Method 400 depicts another embodiment of pro-active collaboration between a configuration tracking server and a configuration tracking agent in order to maintain asset data redundancy via an explicit data redundancy technique. In some embodiments, method 400 is performed by the components illustrated with respect to FIG. 2.

Generally, historical information may be needed to track changes and for reporting purposes. In one embodiment, historical asset data may be maintained on both a configuration tracking server and a configuration tracking agent. How long the historical asset data is maintained may be determined by a data retention and/or privacy policy associated with the asset data. In addition, multiple historic copies of asset data may be versioned. The versioning may be done either by automatically-generated version numbers or timestamps. Versioning assists in the ability to re-construct the historical aspects of the asset data. In one embodiment, method 400 utilizes historical and versioned asset data to provide explicit data redundancy.

Method 400 begins at processing block 410, where historical asset data is maintained and versioned at the configuration tracking server. Then, at processing block 420, the same historical asset data is maintained and versioned at the configuration tracking agent. At decision block 430, it is determined whether the configuration tracking server database is corrupted or lost. If so, then the configuration server collects the historical asset data from the agent at processing block 440. This historical asset data may be used to restore the configuration tracking server.

If the configuration tracking server database is not corrupted or lost, then, at decision block 450, it is determined whether the historical asset data maintained by the configuration tracking agent is lost or corrupted. If so, then the agent collects the historical asset data from the configuration tracking server at processing block 460. This data may be used to restore the agent. Otherwise, the process returns to processing block 410. In one embodiment, disaster recovery of the configuration tracking system may operate in a similar fashion, except that both the server and its database are lost, and a different server (i.e., a spare server) collects the data from the agent and reconstructs the data. In some embodiments, the process of processing blocks 450 and 460 may be optional.

Figure 5:
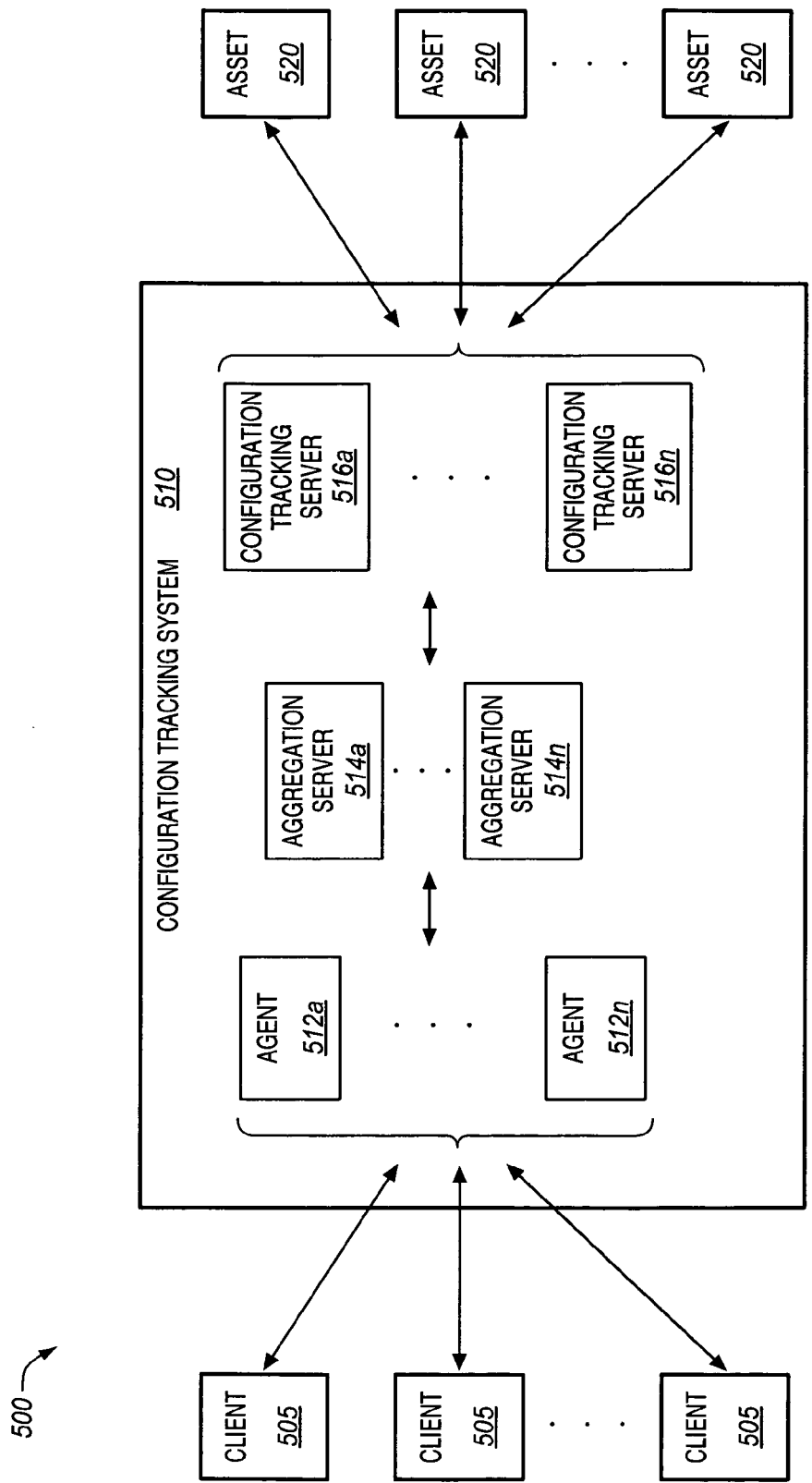
FIG. 5 is a block diagram of another embodiment of a configuration tracking system implementation.

FIG. 5 is a block diagram of one embodiment of a system 500 for collaborative and explicit data redundancy for a configuration tracking system. System 500 includes a configuration tracking system 510 communicatively coupled with a plurality of clients 505 and assets 520. Configuration tracking system 510 includes one or more agents 512a-512N, one or more aggregation servers 514a-514N (such as on-site servers, a point-of-presence servers, etc.), and one or more configuration tracking servers 516a-516N.

In one embodiment, the components of configuration tracking system 510 operate in a similar fashion as the components of configuration tracking system 210 described with respect to FIG. 2. In other embodiments, system 500 is capable of performing methods 300 and 400 described with respect to FIGS. 3 and 4. In some embodiments, system 500 is capable of extending the core ideas of methods 300 and 400 in a variety of ways, which will be detailed below.

In one embodiment, configuration tracking system 510 provides a hierarchy of aggregation points. Configuration tracking system 510 is capable of maintaining copies and/or versions of asset data in an aggregation server 514a-514N. In some embodiments, the aggregation server 514a-514N serves as an aggregation point for collecting, buffering, and transmitting data between the assets 520 and the configuration tracking servers 516a-516N. In these embodiments, the aggregation server 514a-514N may maintain historical data, as well as the most current data, for the agents 512a-512N served by the aggregation server 514a-514N, and possibly in addition to the agents 512a-512N (i.e., there may be two or more copies of the asset data). This concept may be further extended as necessary if there are additional levels in the aggregation hierarchy.

Versioning historical data and multiple data instances of the same data are complimentary concepts. For example, in addition to keeping redundant copies of the current version data at various points in the hierarchy of the configuration tracking system to increase data availability, multiple versions of the data may also be kept in these locations. If historical data is needed to perform trend analysis or reporting, the multiple versions of the same data stored at each point in the hierarchy may be utilized.

In another embodiment, assuming that current asset data is more important than older data, the recovery scheme of the configuration tracking system 510 may be designed to upload more recent versions of asset data before the older versions. This allows bandwidth consumption to be throttled in order to avoid large spikes over short periods of time during reconstruction. In some embodiments, the reconstruction may be spread out across a number of days. With each day, more data is recovered from the agents 512a-512N, and the configuration tracking servers 516a-516N obtain a more complete history.

In yet another embodiment, copies of current and historical asset data may be distributed among the multiple configuration tracking servers 516a-516N. Such an architecture may be implemented if the configuration tracking implementation is horizontally scaled by providing a large number of commodity servers or cluster of servers (also known as pods). Each configuration tracking server instance 516a-516N may hold the asset data for a subset of the assets 520. A configuration tracking server instance 516a-516N may perform batch or delayed replication of its data to other server instances to improve redundancy.

In one embodiment, a server instance 516a-516N may be designed as the primary server responsible for handling client requests for information on a subset of the assets. When a primary configuration tracking server instance fails, a backup configuration tracking server instance(s) 516a-516N may operate using old versions of the asset data if the most current version is not available. The backup configuration tracking server instance(s) should know if it is acting on stale information, and behave and compensate accordingly (e.g., operate in degrade mode).

For example, a primary configuration tracking server instance 516a-516N serving five assets 520 may distribute acquired configuration information from each these five assets to one or more other configuration tracking server instances 516a-516N. When the primary configuration tracking server instance fails, primary responsibility for serving client requests for these five assets may be assigned to one or more different server instances. Primary responsibility for serving client requests for the five assets may then be distributed across other multiple server instances. These other server instances may assemble the asset data associated with the assets assigned to them. The assembly may be done by utilizing asset data previously replicated by the original primary server instance during normal operation or by re-acquiring the asset data from one or more agents 512a-512N or one or more aggregation servers 514a-514N that have data on these five assets.

In some embodiments, version numbers or timestamps may be used to identify the data that is the freshest version for each asset and also to identify whether the freshest version is stale. In another embodiment, asset data that would normally be maintained on an agent 512a-512N may be replicated. This is similar to using the other configuration tracking servers 516a-516N as proxies to store replicas of what would normally be maintained by the agent(s) 512a-512N. Similarly, in other embodiments, aggregation servers 514a-514N may be used for replication of data throughout the configuration tracking system 510.

Figure 6:
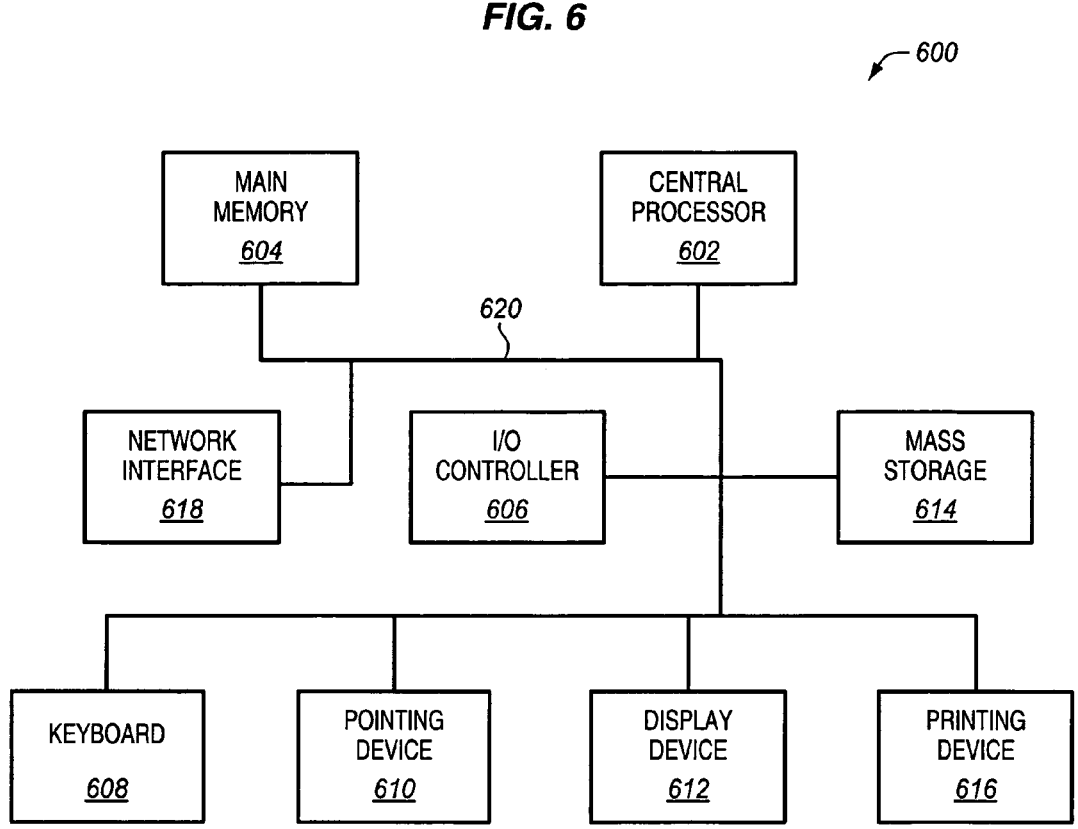
FIG. 6 is an illustration of an embodiment of a computer system.

FIG. 6 illustrates an exemplary computer system 600 in which certain embodiments of the present invention may be implemented. In one embodiment, an asset may be implemented as system 600 or as components of system 600. In other embodiments, an agent may run on system 600. In yet other embodiments, the server instance may be implemented as system 600.

System 600 comprises a central processor 602, a main memory 604, an input/output (I/O) controller 606, a keyboard 608, a pointing device 610 (e.g., mouse, track ball, pen device, or the like), a display device 612, a mass storage 614 (e.g., a nonvolatile storage such as a hard disk, an optical drive, and the like), and a network interface 618. Additional input/output devices, such as a printing device 616, may be included in the system 600 as desired. As illustrated, the various components of the system 600 communicate through a system bus 620 or similar architecture.

In a further embodiment, system 600 may be a distributed computing system. In other words, one or more of the various components of the system 600 may be located in a physically separate location than the other components of the system 600. Such components may be accessed and connected via a network to the other components In accordance with an embodiment of the present invention, the computer system 600 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 602 may be a complex instruction set computer (CISC) microprocessor, a reduced instruction set computing (RISC) microprocessor, a very long instruction word (VLIW) microprocessor, a processor implementing a combination of instruction sets, and the like.

The network interface 618 provides communication capability with other computer systems on a same local network, on a different network connected via modems and the like to the present network, or to other computers across the Internet. In various embodiments of the present invention, the network interface 618 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 600 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 600 is a general purpose computer capable of running any number of applications such as those available from companies including Oracle, Siebel, Unisys, Microsoft, and the like.

Because a configuration tracking application is aware and actively participating in data replication and recovery, it may selectively replicate and recover certain data, instead of depending on an underlying replication mechanism, such as database, file system or disk volume replication that indiscriminately replicates and recovers. This is generally more efficient than indiscriminate replication, and provides better recovery times and higher availability.

Furthermore, other advantages of the various embodiments include reduction of operational costs, improvement of disaster recovery flexibility and resiliency, and improved redundancy. Embodiments of the invention reduce ongoing operational cost for running a highly available configuration tracking service because there is no need for database/volume replication across sites for disaster recovery. There is more flexibility for disaster recovery because any spare configuration tracking server instance may be used for disaster recovery as the spare server instance may be stateless. With the traditional approach, the disaster recovery site is pre-determined and is the site that has been receiving replicated data. The proposed approach is also more resilient. It may survive failures of multiple sites. Furthermore, the same data may be replicated across server instances or among the agents, and may utilize aggregation point hierarchy for increased redundancy.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method, comprising:

obtaining, by an agent for a configuration tracking system, asset data from an asset, wherein the asset data for the asset is descriptive of how the asset is configured at a snapshot in time, wherein the asset comprises one or more of a computer, a storage device, a network device, or a software package;

transferring the asset data from the agent to a server of the configuration tracking system;

storing at the server the asset data or asset information based on the asset data, wherein the server stores the asset data or the asset information within an underlying data store comprising one or more of a database, a file system, or a disk volume;

providing, by the server, access to the asset data or the asset information to one or more clients;

determining that the asset data or the asset information stored at the server is lost or corrupted;

in response to determining that the asset data or the asset information stored at the server is lost or corrupted, reconstructing the asset data or the asset information at the server or another server of the configuration tracking system, wherein said reconstructing comprises:

requesting, by the server or the other server, the agent to retrieve current asset data;

retrieving by the agent the requested current asset data from the asset such that the asset serves as an authoritative source for the current asset data for said reconstructing at the server or the other server; and transferring by the agent the current asset data to the server or the other server for reconstructing the asset data or the asset information at the server or the other server;

wherein said reconstructing is performed without utilizing data redundancy services provided by said underlying data store or any other underlying data store within the configuration tracking system, such that the configuration tracking system actively participates in replication and recovery of asset data to selectively replicate and recover said asset data without dependence on a replication mechanism provided by said underlying data store or any other underlying data store within the configuration tracking system.

2. The method of claim 1, wherein the configuration tracking system comprises an application to store configuration information associated with the asset data.

3. The method of claim 1, further comprising:
maintaining a copy of the asset data on the agent; and
transferring the copy of the asset data on the agent to the server when the server requests a copy of the asset data.

4. The method of claim 1, further comprising maintaining a plurality of versions of the asset data in at least one of the server and the agent, wherein a recovery scheme of the configuration tracking system recovers more recent versions of the asset data before less recent versions of the asset data.

5. The method of claim 4, wherein the plurality of versions are maintained for a period of time determined by a data retention policy of the asset data.

6. The method of claim 4, wherein the plurality of versions are each identified by at least one of an automatically generated version number and a timestamp.

7. The method of claim 1, further comprising operating an aggregation server as an aggregation point in the configuration tracking system to maintain historical and current copies of the asset data for the server and for the agent, wherein the aggregation server is distinct from the one or more clients.

8. The method of claim 1, wherein current and historical copies of the asset data are distributed among a plurality of server pods of the configuration tracking system, the plurality of server pods including the server.

9. The method of claim 8, wherein one or more of the plurality of server pods operates as a back-up pod for a primary server pod of the plurality of server pods by storing additional copies of the asset data that is located in the primary server pod.

10. The method of claim 9, wherein the back-up pod operates by utilizing a historical copy of the asset data if a current copy of the asset data is not available.

11. The method of claim 1, wherein the server processes the asset data to create the asset information relating to the asset data, the asset information including at least one of consistency of the asset data, storage reformatting information, or links to track relationships among the asset and one or more other assets.

12. An article of manufacture, comprising a non-transitory machine-readable storage medium including data stored thereon that, when executed by a machine, cause the machine to perform operations comprising:
receiving, at a server of a configuration tracking system from an agent for the configuration tracking system, asset data obtained by the agent from an asset, wherein the asset data for the asset is descriptive of how the asset is configured at a snapshot in time, wherein the asset comprises one or more of a computer, a storage device, a network device, or a software package;
storing at the server the asset data or asset information based on the asset data, wherein the server stores the asset data or the asset information within an underlying data store comprising one or more of a database, a file system, or a disk volume;
providing, by the server, access to the asset data or the asset information to one or more clients;
determining that the asset data or the asset information stored at the server is lost or corrupted;
in response to determining that the asset data or the asset information stored at the server is lost or corrupted, reconstructing the asset data or the asset information at the server, wherein said reconstructing comprises:
requesting, by the server, the agent to retrieve current asset data;
receiving, by the server from the agent, the requested current asset data from the asset such that the asset serves as an authoritative source for the current asset data for said reconstructing at the server; and
wherein said reconstructing is performed without utilizing data redundancy services provided by said underlying data store or any other underlying data store within the configuration tracking system, such that the configuration tracking system actively participates in replication and recovery of asset data to selectively replicate and recover said asset data without dependence on a replication mechanism provided by said underlying data store or any other underlying data store within the configuration tracking system.

13. The article of manufacture of claim 12, wherein the machine-readable storage medium further includes data that cause the machine to perform operations comprising:
maintaining a copy of the asset data on the agent; and
transferring the copy of the asset data on the agent to the server when the server requests a copy of the asset data.

14. The article of manufacture of claim 12, wherein the configuration tracking system comprises an application to store configuration information associated with the asset data.

15. The article of manufacture of claim 12, wherein current and historical copies of the asset data are distributed among a plurality of server pods of the configuration tracking system, wherein the plurality of server pods includes the server.

16. The article of manufacture of claim 15, wherein one or more of the plurality of server pods operates as a back-up pod for a primary server pod of the plurality of server pods by storing additional copies of the asset data located in the primary server pod.

17. An apparatus, comprising:
a computer-implemented server of a computer-implemented configuration tracking system application communicatively coupled to a computer-implemented agent for the configuration tracking system application, operating to:
receive, at a server from the agent, asset data obtained by the agent from an asset, wherein the asset data for the asset is descriptive of how the asset is configured at a snapshot in time, wherein the asset comprises one or more of a computer, a storage device, a network device, or a software package;
store at the server the asset data or asset information based on the asset data, wherein the server stores the asset data or the asset information within an underlying data store comprising one or more of a database, a file system, or a disk volume;
provide, by the server, access to the asset data or the asset information to one or more clients;
the server or another server of the configuration tracking system application configured to reconstruct the asset data or the asset information at the server or the other server in response to determining that the asset data or the asset information stored at the server is lost or corrupted, wherein to reconstruct the asset data or the asset information the server or the other server is configured to:
request the agent to retrieve current asset data;
receive the current asset data from the agent such that the asset serves as an authoritative source for the current asset data for said reconstructing at the server or the other server;

wherein said reconstructing is performed without utilizing data redundancy services provided by said underlying data store or any other underlying data store utilized by the computer-implemented configuration tracking system application, such that the configuration tracking system application actively participates in replication and recovery of asset data to selectively replicate and recover said asset data without dependence on a replication mechanism provided by said underlying data store or any other underlying data store utilized by the configuration tracking system application.

18. The apparatus of claim 17, wherein the computer-implemented agent maintains a copy of the asset data to transfer to the computer-implemented server if the asset data on the computer-implemented server becomes corrupted.

19. The apparatus of claim 18, wherein the computer-implemented server and the computer-implemented agent maintain a plurality of versions of the asset data that are available to asset data consumers if the copies of the asset data on the computer-implemented server and computer-implemented agent become corrupted, and wherein a recovery scheme of the configuration tracking system recovers more recent versions of the asset data before less recent versions of the asset data.

20. The apparatus of claim 17, wherein the computer-implemented configuration tracking system application comprises a service to store configuration information associated with the asset data.

\* \* \* \* \*